US008882052B2

(12) United States Patent
Komiya (10) Patent No.: US 8,882,052 B2
(45) Date of Patent: Nov. 11, 2014

(54) MULTI-JOINT CABLE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 439 days.

(21) Appl. No.: 13/047,783

(22) Filed: Mar. 14, 2011

(65) Prior Publication Data
US 2011/0240805 A1     Oct. 6, 2011

(30) Foreign Application Priority Data
Apr. 2, 2010  (JP) .................................. 2010-085693

(51) Int. Cl.
  *F16L 3/22*   (2006.01)
  *F16G 13/20*  (2006.01)
  *G02B 6/44*   (2006.01)
  *H02G 11/00*  (2006.01)

(52) U.S. Cl.
  CPC .............. *F16G 13/20* (2013.01); *G02B 6/4461* (2013.01); *H02G 11/006* (2013.01)
  USPC .................. 248/68.1; 248/60; 248/62; 248/51

(58) Field of Classification Search
  USPC ............... 248/68.1, 49, 634, 51, 60, 62, 74.1, 248/74.2, 74.3, 65, 79.4, 73; 59/78.1, 900; 174/21 JS, 74 A, 19
  See application file for complete search history.

(56) References Cited

U.S. PATENT DOCUMENTS

| | | | | |
|---|---|---|---|---|
| 3,664,619 A * | 5/1972 | Heidrich | ......................... | 248/51 |
| 4,455,720 A * | 6/1984 | Sutton | ........................... | 24/20 S |
| 4,658,577 A * | 4/1987 | Klein | ............................. | 59/78.1 |
| 6,065,278 A * | 5/2000 | Weber et al. | ................... | 59/78.1 |
| 6,107,565 A * | 8/2000 | O'Rourke | ........................ | 174/51 |
| 6,367,238 B1 * | 4/2002 | Fischer | ......................... | 59/78.1 |
| 6,374,589 B1 * | 4/2002 | Kunert et al. | ................... | 59/78.1 |
| 6,516,602 B2 * | 2/2003 | Sakai et al. | .................... | 59/78.1 |
| 6,787,702 B2 * | 9/2004 | Suzuki | ........................ | 174/72 A |
| 6,858,797 B2 * | 2/2005 | Sheikholeslami et al. | .... | 174/480 |
| 6,966,527 B2 * | 11/2005 | Komiya | .......................... | 248/49 |
| 6,984,782 B2 * | 1/2006 | Ikeda et al. | ................. | 174/21 JS |
| 7,017,328 B2 * | 3/2006 | Komiya et al. | ................ | 59/78.1 |

(Continued)

FOREIGN PATENT DOCUMENTS

| | | |
|---|---|---|
| JP | 2004019870 | 1/2004 |
| JP | 2006275155 | 10/2006 |

(Continued)

*Primary Examiner* — Terrell McKinnon
*Assistant Examiner* — Monica Millner
(74) *Attorney, Agent, or Firm* — Woodling, Krost and Rust (57) ABSTRACT

There is provided a multi-joint cable protection and guide device that fits well with a flexible belt member in a flexed posture, that steadily protects and smoothly guides cables that assume the flexed posture, that requires fewer parts and that may be readily connected and disconnected corresponding as desired according to usage. The multi-joint supporting member has the flexible belt member in which cable inserting tubular portions are unitarily molded in parallel and a train comprising a plurality of block bodies flexibly connected with each other by concave-convex snap-fittings. The train of block bodies is inserted through the cable inserting tubular portions to control and support straight and flexed postures of the flexible belt member and each block body has a flexion outer peripheral-side curved surface whose curvature is equal to a radius of a flexed circular arc in the flexed posture.

7 Claims, 5 Drawing Sheets

(56) References Cited

U.S. PATENT DOCUMENTS

| | | | |
|---|---|---|---|
| 7,040,081 B2* | 5/2006 | Komiya | 59/78.1 |
| 7,045,705 B2* | 5/2006 | Ikeda et al. | 174/21 R |
| 7,174,702 B2* | 2/2007 | Ikeda et al. | 59/78.1 |
| 7,240,477 B1* | 7/2007 | Dunfee et al. | 59/78.1 |
| 7,418,812 B2* | 9/2008 | Ikeda et al. | 59/78.1 |
| 7,576,283 B2* | 8/2009 | Kadrnoska et al. | 174/21 JS |
| 7,617,669 B1* | 11/2009 | Komiya et al. | 59/78.1 |
| 7,784,259 B2* | 8/2010 | O'Rourke et al. | 59/78.1 |
| 7,942,169 B2* | 5/2011 | Komiya et al. | 138/110 |
| 7,971,833 B2* | 7/2011 | Utaki et al. | 248/49 |
| 8,598,461 B2* | 12/2013 | Lind et al. | 174/117 F |
| 2001/0025715 A1* | 10/2001 | Muller et al. | 174/19 |
| 2002/0043591 A1* | 4/2002 | Sakai et al. | 248/49 |
| 2003/0042040 A1* | 3/2003 | Komiya et al. | 174/72 A |
| 2004/0112625 A1* | 6/2004 | Sheikholeslami et al. | 174/68.1 |
| 2004/0222002 A1* | 11/2004 | Ikeda et al. | 174/19 |
| 2006/0022494 A1* | 2/2006 | Sanderson | 297/29 |
| 2007/0241239 A1* | 10/2007 | Utaki et al. | 248/49 |
| 2008/0066821 A1* | 3/2008 | Komiya et al. | 138/110 |
| 2008/0120958 A1* | 5/2008 | Utaki et al. | 59/78.1 |
| 2008/0265105 A1* | 10/2008 | Utaki et al. | 248/68.1 |
| 2009/0074149 A1 | 3/2009 | Van Der Ende | |
| 2009/0266046 A1* | 10/2009 | Komiya et al. | 59/78.1 |
| 2009/0320950 A1* | 12/2009 | Carew et al. | 138/115 |
| 2010/0050589 A1* | 3/2010 | Komiya | 59/78.1 |
| 2011/0121141 A1 | 5/2011 | Tatsuta | |

FOREIGN PATENT DOCUMENTS

| | | |
|---|---|---|
| JP | 4157096 | 9/2008 |
| JP | 4157096 B2 | 9/2008 |
| WO | 2004049509 | 6/2004 |

* cited by examiner

MULTI-JOINT CABLE PROTECTION AND GUIDE DEVICE

CROSS REFERENCE TO RELATED APPLICATIONS

This application claims the foreign priority benefit under Title 35, United States Code, §119 (a)-(d) of Japanese Patent Application No. 2010-085693, filed on Apr. 2, 2010 in the Japan Patent Office, the disclosure of which is herein incorporated by reference in its entirety.

BACKGROUND OF THE INVENTION

1. Field of the Invention

The present invention relates to a multi-joint cable protection and guide device for protecting and guiding flexible cables and hoses. The flexible cable may be an electrical cable or an optical fiber cable. The flexible hose may be a fluid supplying hose. The cables and hoses may be used in working machines, electronic devices, industrial robots, and transportation equipment. The cables and hoses supply electricity, fluid, and air machines or to a mobile section of a machine.

2. Related Art

When the cables are connected to a mobile portion of a working machine such as a construction machine or a machine used for transportation, the cables are twisted or tensioned unnaturally as the mobile portion of the machine moves. The cables and hoses are damaged when they are twisted and tensioned unnaturally. The multi-joint cable protection and guide device is used to protect and guide cables and hoses that would otherwise become damaged if it were not for the supporting member.

There is a known related art multi joint cable protection and guide device, specifically, there is an assembly supporting member in which conduit tubes for transferring conductors and gases are sealed within a plurality of channels. The channels include supporting members composed of continuous material strips which are disposed in parallel. The continuous material strips have a series of non-interlocking motion-limiting solid bodies as disclosed in Japanese Patent No. 4157096 (Claims Paragraphs [[0031] through [0034], FIG. 21); Patent Family of WO/2004/049509A2, U.S. Pat. No. 6,858,797B2 for example.

PROBLEMS TO BE SOLVED BY THE INVENTION

However, the related art assembly supporting member has some problems. The related art includes a flexible member composed of an assembly supporting member which is a stainless steel member or a leaf spring. The assembly supporting member is unable to hold an accurate radius of flexion and the radius of flexion becomes too large when the assembly supporting member is bent. It then becomes difficult to arrange the assembly supporting member within a predetermined space because the assembly supporting member may encounter an obstacle located in a nearby position.

When the stainless steel member is used as the flexible member, in particular, the assembly supporting member may become useless because the flexible member may experience fatigue and then breakdown and rupture when used for a long period of time.

The related art assembly supporting member has another problem in that the flexible member composing the assembly supporting member is a stainless steel member or the leaf spring which cannot be easily cut. The supporting member cannot be replaced with a new and different supporting member to prolong use of the device and thus the supporting member cannot be used and is, in effect, useless and wasted. Further, because the torsional rigidity of the flexible member is low, the flexible member resonates. As a result, operation of the device wherein it alternately assumes flexed and straight postures may become unstable.

Furthermore, pieces of the related art assembly supporting member are made of resin by injection-molding one at a time in connection with the stainless steel member or the leaf spring. This process requires a lot of time and labor and makes mass production difficult.

In addition, because the assembly supporting member develops corners formed of intermittent flexions where bending stress is prone to be concentrated by these pieces that flex polygonally, the corners caused by such intermittent flexions may press or damage the conductor cables or the conduit tubes transporting gases within the channel. The corners caused by the intermittent flexions may also thrust up the channel intermittently in assuming the flexed posture. Then, the corners may damage the channel itself or may cause noise by generating intermittent sounds of contact with a floor surface where the assembly supporting member guides the cables.

SUMMARY OF THE INVENTION

Accordingly, the present invention aims at solving the aforementioned related art problems by providing a multi-joint cable protection and guide device that fits well with a flexible belt member composed of a large number of cable inserting tubular portions. The cable inserting tubular portions may assume a flexed posture. The member steadily protects and smoothly guides cables and hoses which flex. The device requires fewer parts than the related art and may be readily connected and disconnected corresponding to its usage.

Means for Solving the Problems

In order to solve the aforementioned problems, according to a first aspect of the invention, there is provided a multi-joint cable protection and guide device having a flexible belt member. The flexible belt member includes a plurality of cable inserting tubular portions unitarily molded in parallel. The flexible belt member includes a train comprising a plurality of block bodies flexibly connected with each other by concave-convex snap-fittings. The train of block bodies is inserted through at least one of the cable inserting tubular portions to control and support straight and flexed postures of the flexible belt member. Each block body has a flexion outer peripheral-side curved surface whose curvature is equal to a curvature of a flexed circular arc of the flexed posture defined by connection of the block bodies. Sometimes herein the words "flexion outer peripheral side curved surface" are used; however, each of the plurality of block bodies forming said train of block bodies are flexibly and articulately connected to each other in a longitudinal direction enabling the block bodies to form a flexional circumferential bend having a flexional inner circumferential side and flexional outer circumferential side. Each of the block bodies includes a flexional inner circumferential side residing during bending on said flexional inner circumferential side of said bend. Further, each of the block bodies includes a flexional outer circumferential side having a curved surface residing during bending on the flexional outer circumferential side of said bend.

A second aspect of the invention solves the aforementioned problems by using block bodies having connecting pins at front portions thereof and connecting pin holes at rear portions thereof. The block bodies are flexibly connected with each other by concave-convex snap-fitting of connecting pins into connecting pin holes of the preceding block body.

A third aspect of the invention solves the aforementioned problems by using block bodies provided with tapered cut-away fitting portions which enable easy connection of the block bodies to each other. The tapered cut-away fitting portions allow access to the connecting pin holes in the rear portions of the block bodies. This enables concave-convex snap-fitting of the connecting pins of one block body into the connecting pin holes at the rear portion of the adjacent block body.

A fourth aspect of the invention solves the aforementioned problems by providing block bodies having straight posture holding surfaces for keeping the block bodies in the straight posture and flexed posture holding surfaces for keeping the block bodies in the flexed posture.

A fifth aspect of the invention solves the aforementioned problems by molding the block body from a synthetic resin material.

A sixth aspect of the invention solves the aforementioned problems by using block bodies having a rectangular shape in which the four corners thereof are chamfered along the longitudinal direction.

Advantageous Effects of the Invention

According to the first aspect of the invention, the multi-joint cable protection and guide device has the flexible belt member. The flexible belt member includes a plurality of cable inserting tubular portions which are unitarily molded in parallel. A train comprises a plurality of block bodies that are flexibly connected with each other by concave-convex snap-fittings. The train of block bodies is inserted through at least one of the cable inserting tubular portions to control and support straight and flexed postures of the flexible belt member. It is unnecessary, due to this structure, to injection-mold pieces one by one with respect to a stainless steel member or a leaf spring as is done in the related art.

Accordingly, it is easy to connect and disconnect the multi-joint cable protection and guide device corresponding to its usage, as compared to the related art flexible member composed of a supporting member such as a stainless steel member which is difficult to cut.

Because the large numbers of block bodies are flexibly connected by the concave-convex snap-fittings, the multi-joint cable protection and guide device can steadily protect and guide the cables that assume flexed and straight postures.

Furthermore, it becomes possible to remarkably reduce the number of required parts as compared to the related art which require various long and short supporting members to be prepared corresponding to its usage.

Each of the block bodies have the flexion outer peripheral-side curved surface whose curvature is equal to the curvature of the flexed circular arc of the flexed posture (for example, the radius of curvature). The curvature of the flexed circular arc of the flexed posture is defined by the connection of the block bodies and the flexed posture of the flexible belt member. The flexed posture of the flexible belt member presents a continuous single smooth circular arc. The multi-joint supporting member fits well with the flexible belt member composed of the large number of cable inserting tubular portions even in the flexed posture.

Bending stress is homogeneously dispersed without concentrating the stress upon certain parts of the cables inserted through the flexible belt member so that it becomes possible to remarkably reduce the bending load applied to the flexible belt member and the cables. This homogeneous dispersal of the stress reduces damage to the cable and remarkably reduces intermittent contact sounds generated in contacting with a floor surface where the cables are guided.

According to the second aspect of the multi joint cable protection and guide device of the invention, each of the block bodies includes connecting pins at the front portions thereof and each of the block bodies includes connecting pin holes at the rear portions thereof. The block bodies are flexibly connected with each other by concave-convex snap-fitting the connecting pins of one block body into the connecting pin holes of the preceding block body. The connecting pins of the succeeding block body are pivoted turnably with respect to the connecting pin holes of the preceding block body in which they reside. This construction enables the cables to be smoothly guided by shifting the postures of the block bodies from the straight posture to the flexed posture or from the flexed posture to the straight posture.

According to the third aspect of the multi-joint cable protection and guide device of the invention, each of the block bodies includes a tapered cut-away fitting portion which extends from the outer peripheral curved surface to the connecting pin hole at the rear portion thereof. This construction enables the connecting pin of the next adjacent block body to slide along the tapered cut-away portion and into the connecting pin hole at the rear portion of the next adjacent block body. A concave-convex snap-fit connects the pins and the pin holes. The tapered cut-away fitting portions of the block body enables assembly of the block bodies without requiring excessive fitting power in connecting and disconnecting the block bodies. Accordingly, it becomes easy to connect and disconnect the supporting members corresponding to its usage.

According to the fourth aspect of the multi-joint cable protection and guide device of the invention, each of the block bodies includes straight posture holding surfaces for keeping the block bodies in the straight posture and each of the block bodies includes the flexed posture holding surfaces for keeping the block bodies in the flexed posture. The straight and flexed posture holding surfaces steadily position and keep the flexible belt member in the straight posture or the flexed posture. Accordingly, even if the supporting member is installed in a narrow space in which obstacles are closely located, the multi-joint cable protection and guide device can steadily protect and guide the cables that assume the flexed and straight postures in the narrow installation space.

According to the fifth aspect of the multi-joint cable protection and guide device of the invention, the block body is molded from a synthetic resin material. Thus, it becomes easy to form the configurations of the connecting pins at the front portion thereof and to form the configuration of the connecting pin holes at the rear portion thereof. Thus, it is also easy to form the cut-away fitting portions for the concave-convex snap-fitting of the connecting pins, the straight posture holding surfaces for keeping the block bodies straight, and, the flexed posture holding surfaces for keeping the block body in the flexed posture. Use of the synthetic resin makes fabrication of the light-weight block bodies easy and enables connection and disconnection of the block bodies as desired. Use of the synthetic resin also enables smooth turns of the connecting pins with respect to the connecting pin holes. Thus, the need for power is remarkably reduced in shifting between the flexed posture and the straight posture because the synthetic resin is self-lubricating.

According to the sixth aspect of the multi-joint cable protection and guide device of the invention, the block body is formed into a rectangular shape in which four corners are chamfered along the longitudinal direction. Even if the block bodies are displaced relatively in the vertical and lateral directions within the cable inserting tubular portion of the flexible belt member, the block bodies will not be jammed by the four corners thereof within the cable inserting tubular portion. This construction presents the flexed and straight postures smoothly within the cable inserting tubular portion of the flexible belt member.

BEST MODES FOR CARRYING OUT THE INVENTION

Preferred Embodiments

An embodiment of a multi-joint cable protection and guide device of the invention will be explained with reference to FIGS. 1 through 7.

Figure 1:
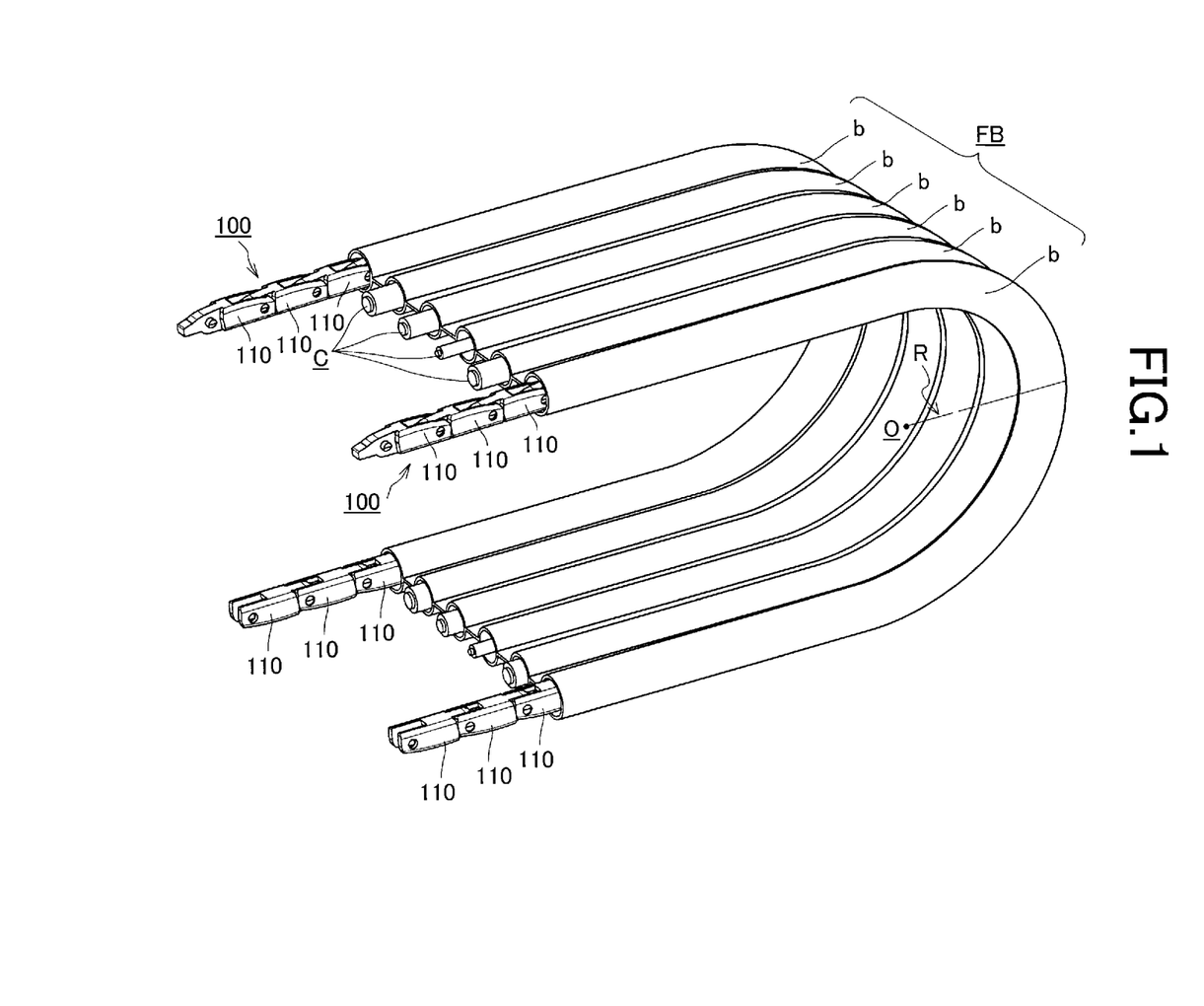
FIG. 1 illustrates a mode of use of a multi-joint cable protection and guide device according to one embodiment of the invention.
Figure 2:
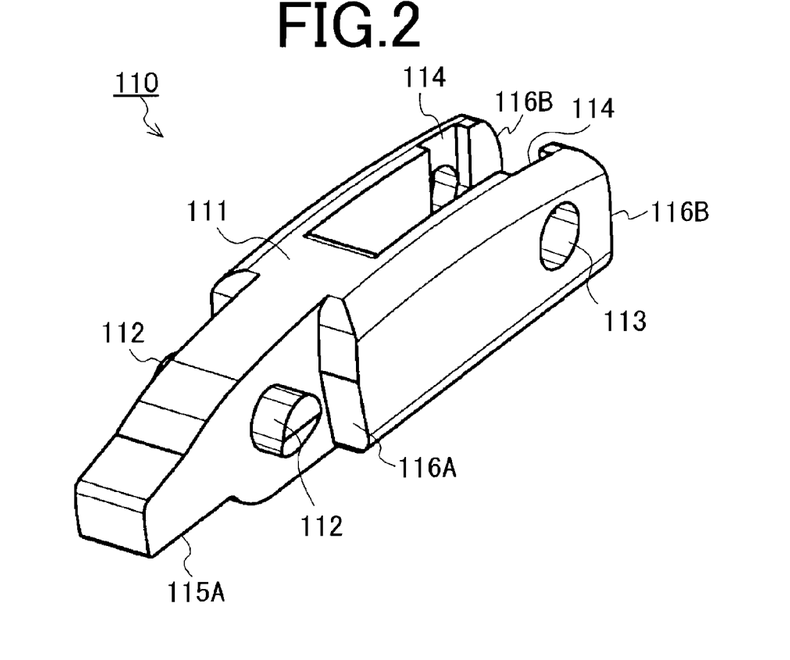
FIG. 2 is a perspective view of a block body shown in FIG. 1 seen from a front obliquely upward direction.
Figure 3:
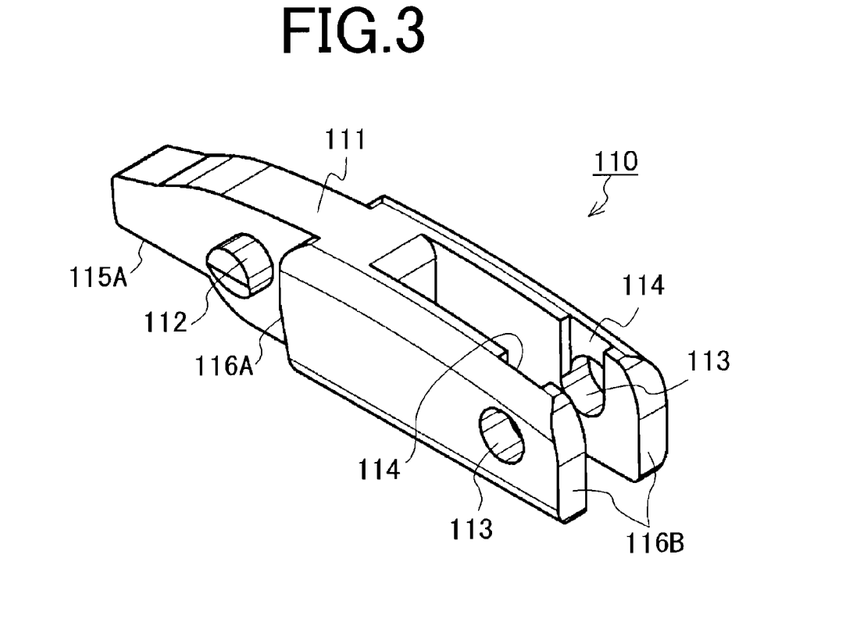
FIG. 3 is a perspective view of a block body shown in FIG. 1 seen from a rear obliquely upward direction.
Figure 4:
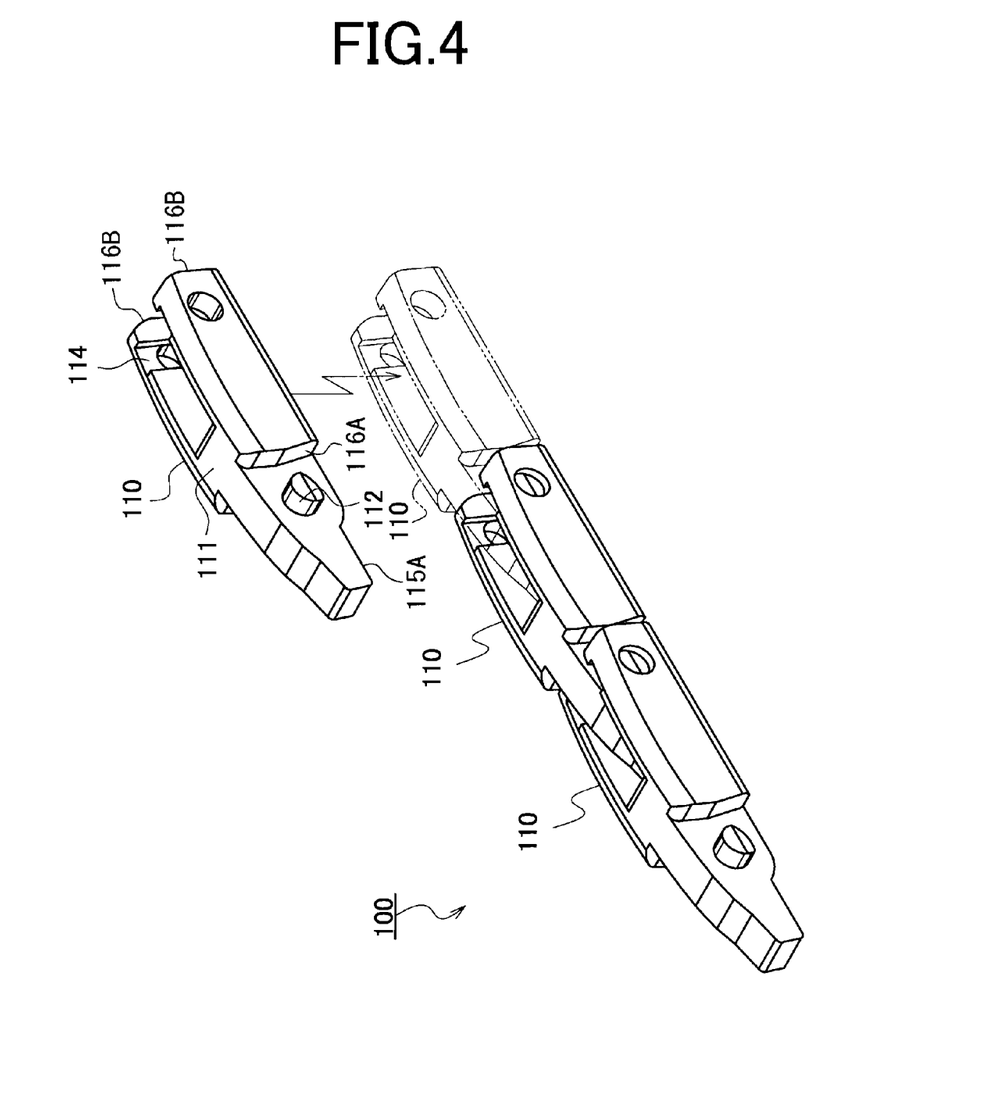
FIG. 4 is an exploded view of the multi-joint cable protection and guide device shown in FIG. 1.
Figure 5:
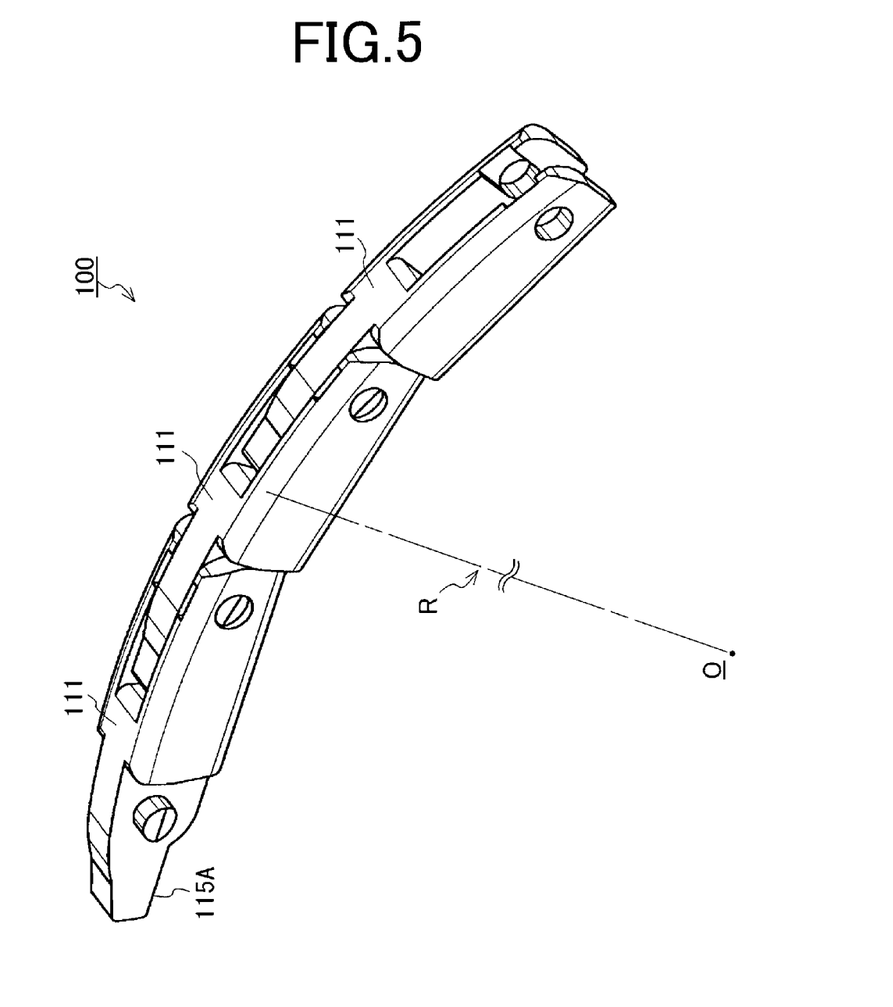
FIG. 5 illustrates a flexed state of the multi-joint cable protection and guide device shown in FIG. 1.
Figure 6:
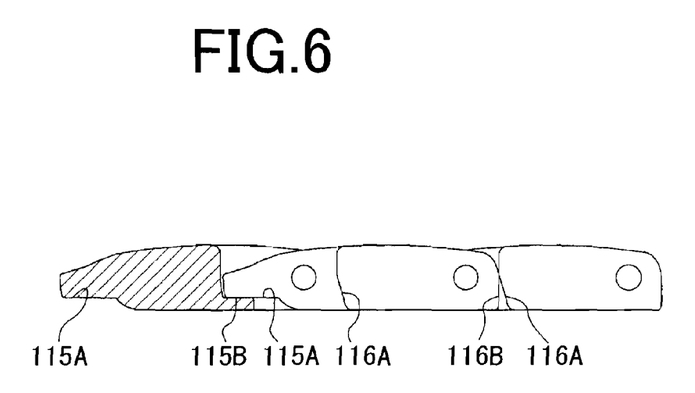
FIG. 6 is a side view showing a straight posture of the multi-joint cable protection and guide device.
Figure 7:
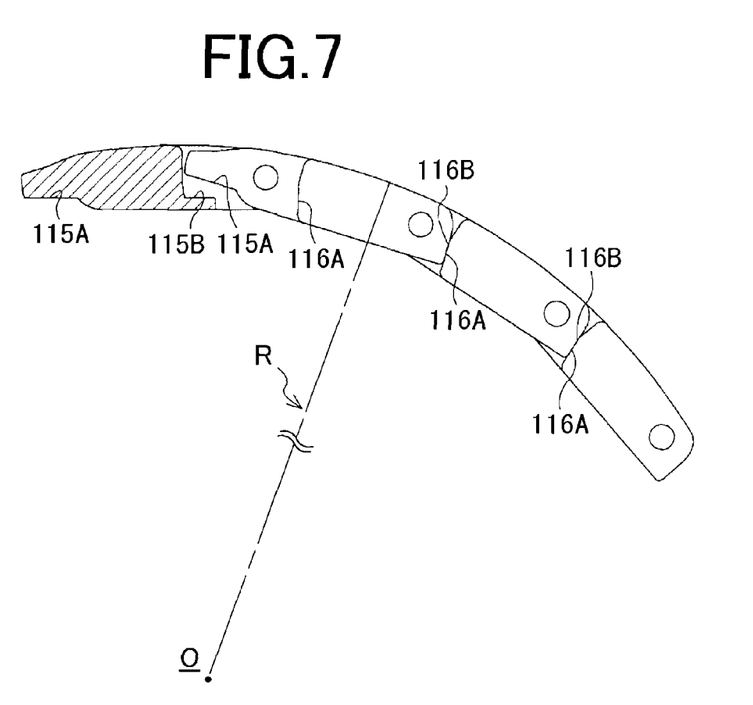
FIG. 7 is a side view showing the flexed posture of the multi-joint cable protection and guide device.

Here, FIG. 1 illustrates a mode of use of a multi-joint cable protection and guide device according to one embodiment of the invention. FIG. 2 is a perspective view of a block body shown in FIG. 1 seen from a front obliquely upward direction. FIG. 3 is a perspective view of a block body shown in FIG. 1 seen from a rear obliquely upward direction. FIG. 4 is an exploded view of the multi-joint cable protection and guide device shown in FIG. 1. FIG. 5 illustrates a bending state of the multi-joint cable protection and guide device shown in FIG. 1. FIG. 6 is a side view showing a straight state of the multi-joint cable protection and guide device. FIG. 7 is a side view showing a bending state of the multi-joint cable protection and guide device.

One embodiment of the multi-joint cable protection and guide device 100 of the invention is used for working machines, electronic devices, industrial robots, and transportation equipment to protect and guide flexible cables and hoses (hereinafter referred to as "cables and the like C"). The cables and hoses may be electrical cables, optical fiber cables, and fluid supplying hoses used for transporting electricity, fluid, and air to such moving machines or to a moving section of the machines.

As shown in FIG. 1, the multi-joint cable protection and guide device 100 of the present embodiment is composed of a flexible belt member, FB, in which six cable inserting tubular portions, b, are molded unitarily in parallel. Trains comprising a plurality of block bodies 110 are formed by connecting the block bodies flexibly with each other by means of concave-convex snap fittings. The trains of the block bodies 110 are inserted through two, e.g., right and left, cable inserting tubular portions, b, among the six cable inserting tubular portions, b, to control and support straight and flexed postures of the flexible belt member.

Thus, the multi joint cable protection and guide device 100 is comprised of repeatedly connecting block bodies, unlike the related art assembly supporting member that requires two injection-molded pieces, a stainless steel member and a leaf spring.

While not shown in FIG. 1, the flexible belt member FB described above is integrally molded by using two sheets. Each sheet includes fluorine resin layers which are laminated on both front and back surfaces of a polyurethane resin layer. The sheets are bulged to form the six cable inserting tubular portions, b, through which the cables and the like C and the multi-joint supporting members 100 are respectively inserted.

Thereby, the polyurethane resin layer is stretchable which allows the flexible belt member FB to stretch. The self-lubricating property of the fluorine resin layer allows the cables, C, to slide within the flexible belt member FB and protects the cables, C, from damage.

A specific configuration of the block body 110, which is the most characteristic part of the multi joint cable protection and guide device 100 of the present embodiment will be explained with reference to FIGS. 2 through 7.

As shown in FIGS. 2, 3, 5 and 7, each of the large number of (plurality of) block bodies 110 described above has a flexion outer peripheral-side curved surface 111 having a curvature (radius of curvature) equal to a curvature of a flexed circular arc R in a flexed posture defined by the connection of the block bodies 110.

Thereby, the flexed posture of the flexible belt member FB presents a continuous and single smooth circular arc, so that the multi joint supporting member fits well with the flexible belt member FB. Even in the flexed posture and bending state, stress is homogeneously dispersed without concentrating the stress to the cables C inserted through the flexible belt member FB.

It is noted that the center of the radius of the flexion circular arc is indicated by O in FIGS. 1, 5 and 7.

As shown in FIGS. 2 and 3, the block body 110 described above is provided with a pair of right and left connecting pins 112 at the front portion thereof and with a pair of right and left connecting pin holes 113 at the rear portion thereof.

Thereby, the connecting pins 112 of the block body 110 snap-fit concavely-convexly into the connecting pin holes 113 provided at the rear portion of a preceding block body 110. Thus, the block bodies 110 are turnably pivoted and are flexibly connected with each other.

The block body 110 is also provided with tapered cut-away fitting portions 114. The cut-away fitting portions are concave in nature and extend continuously from the connecting pin holes 113 to the outer peripheral curved surface at the rear portions thereof. The cut-away fitting portions 114 enable connecting pins 112 described above to be snap-fitted into the connecting pin holes 113.

Thereby, the connecting pins 112 of the succeeding block body 110 may be attached to the connecting pin holes 113 of the preceding block body 110 through the cut-away fitting portions 114 thereof, as shown in FIG. 4, without requiring excessive fitting force in connecting and disconnecting the block bodies 110. Thus, connection and disconnection of the train comprised of a plurality of block bodies 110 as desired is easy and simple.

Furthermore, as shown in FIGS. 2 through 7, the block body 110 is also provided with straight posture holding surfaces 115A and 115B at different locations of the front portion thereof to position the preceding and succeeding block bodies 110 abutting with each other in the vertical direction and to keep them in the straight state. The block body 110 is also provided with flexed posture holding surfaces 116A and 116B at different positions of the rear portion thereof to position the preceding and succeeding block bodies 110 abutting each other in the lengthwise direction and to keep them in the flexed state.

Thereby, the straight posture holding surfaces 115 and flexed posture holding surfaces 116 position and keep the train of block bodies in the straight posture or in the flexed posture corresponding to its motion. Accordingly, even if the cable protection and guide device is installed in a narrow space where obstacles are closely located, the multi-joint cable protection and guide device can steadily protect and guide the cables, C, by assuming the straight posture as shown in FIG. 4 or 6 and the flexed posture, as shown in FIG. 7.

The block body 110 described above is formed into a rectangular shape in section in which four corners are chamfered along the longitudinal direction.

Thereby, even if the block bodies 110 are displaced relatively in the vertical and lateral directions within the cable inserting tubular portions, b, of the flexible belt member, FB, the block bodies 110 will not be jammed by the four corners thereof within the cable inserting tubular portions, b. This construction enables operation in the flexed and straight postures to be smooth within the cable inserting tubular portions, b, of the flexible belt member FB.

The block body 110 described above is molded using glass-fiber reinforced polyamide 66 resin.

Thereby, it becomes easy to:

form the configurations of the flexion outer peripheral-side curved surface 111 on the flexion outer peripheral side of the block bodies;

form the connecting pins 113 at the front portions of the block bodies;

form the connecting pin holes 113 at the rear portions of the block bodies;

form the cut-away fitting portions 114 to enable concave-convex snap-fitting of the connecting pins 112 into the connecting pin holes;

form the straight posture holding surfaces 115 for keeping the block bodies in the straight state; and, form the flexed posture holding surfaces 116 for keeping the block body in the flexed state.

Using the synthetic resin, it becomes easy to fabricate the light-weight block bodies 110 that can be connected and disconnected corresponding to usage.

Using the self-lubricating synthetic resin (glass-fiber reinforced polyamide 66 resin) enables smooth turns of the pivoting part of the connecting pin 112 and the connecting pin hole 113 and thus remarkably reduces power needed in shifting between the flexed posture and the straight posture.

As described above, the multi-joint cable protection and guide device 100 of the present embodiment thus obtained may be easily connected and disconnected corresponding to its usage and can steadily protect and guide the cables that assume the flexed and straight postures. This is accomplished by inserting trains comprising a plurality of (for example, a large number) block bodies 110 flexibly connected with each other through the two cable inserting tubular portions, b, composing the flexible belt member FB to control and support the straight and flexed postures of the flexible belt member FB made of the synthetic resin. Thus, it is unnecessary to inject-mold pieces one by one with respect to a stainless steel member or a leaf spring as is done in the related art.

The block body 110 is provided with the flexion outer peripheral-side curved surface 111 having the curvature equal to the curvature R (radius of curvature) of the flexion circular arc in the flexed posture. The flexed posture of the flexible belt member FB presents a continuous, single and smooth circular arc. As a result of this construction it becomes possible to: remarkably reduce the bending load applied to the flexible belt member FB and the cables C; to reduce damage to the cables; and, to remarkably reduce the intermittent contact sounds generated in contacting with a floor surface where the cables are guided.

The multi-joint cable protection and guide device 100 of the present embodiment includes only the large number of block bodies 110 flexibly connected with each other by the snap-fitting. Fewer parts are thus required compared to the related art supporting members that require various long and short parts to be prepared corresponding to usage.

The specific mode of the multi-joint cable protection and guide device of the present invention may take any mode as long as the cables protection and guide multi-joint cable protection and guide device has the following features. The multi-joint cable protection and guide device has the flexible belt member in which the plurality of cable inserting tubular portions is unitarily molded in parallel. The train comprising the plurality of block bodies are flexibly connected with each other by concave-convex snap-fitting. The train of block bodies is inserted through at least one of the cable inserting tubular portions to control and support straight and flexed postures of the flexible belt member.

Furthermore, each of the block bodies has the flexion outer peripheral side curved surface whose curvature (radius of curvature) is equal to the curvature of the flexed circular arc of the flexed posture defined by the connection of the block bodies.

The multi-joint supporting member fits well with the flexible belt member composed of a plurality of cable inserting tubular portions in the flexed posture. This construction steadily protects and smoothly guides cables that assume the flexed posture. Fewer parts are required and the device is easy to connect and disconnect corresponding to its usage.

The specific configuration of the block body used in the multi-joint cable protection and guide device of the invention may be any shape as long as it is provided with the flexion outer peripheral-side curved surface having the curvature equal to the curvature of the flexion circular arc of the flexed posture formed by the connection of the large number of block bodies. For example, the block bodies may be flexibly connected with each other by concavely-convexly snap-fitting the connecting pins provided at the front portions of the block body into the connecting pin holes provided at the rear portions of the preceding block body or by concavely-convexly snap-fitting the connecting pins provided at the rear portions of the block body into the connecting pin holes provided at the front portions of the succeeding block body. Specifically, the former is preferable.

The material of the block body composing the multi joint supporting member of the invention may be any material as long as it can keep the configurations of:

the connecting pins at the forward portion thereof;

the connecting pin holes at the rear portion thereof;

the cut-away fitting portions for concave-convexly snap-fitting the connecting pins;

the straight posture holding surfaces for keeping the block bodies straight; and, the flexed posture holding surfaces for keeping the block body in the flexed posture.

The preferred material is glass-fiber reinforced polyamide 66 resin, polyacetal resin or ABS resin for example. When the glass-fiber reinforced polyamide 66 resin is used in particular, rigidity and abrasion resistance of the multi-joint supporting member are enhanced, so that the multi-joint supporting member can fully sustain a long period of repetitive use.

The flexible belt member through which the multi-joint cable protection and guide device of the invention is inserted may be one in which the plurality of cable inserting tubular portions, through which the cables are respectively inserted, is unitarily molded in parallel. For example, it may be one unitarily molded piece while arranging tubular objects in parallel or it may be one in which two sheets are laminated while bulging out a plurality of tubular spaces in parallel between the front and back surfaces of the sheets.

The specific configuration of the cable inserting tubular portion may be any shape and may be circular in section or rectangular in section. The number of the cable inserting tubular portions to be installed may be at least one. The cables must be prevented from contacting each other.

The material of the flexible belt member may be any synthetic resin material if it allows the plurality of cable inserting tubular portions to be formed. For example, if a pair of sheets having fluororesin layers are laminated on the front and back surfaces of a stretchable layer are used, the stretchable layer exhibits stretching properties of the flexible belt member and the fluororesin layers allow slidability of the flexible belt member.

Those skilled in the art will readily recognize that the invention has been set forth above with particularity and detail. Changes may be made to the disclosure without departing from the spirit and the scope of the appended claims.

What is claimed is:

1. A multi-joint cable protection and guide device, comprising:
    a flexible belt member, said flexible belt member includes a first polyurethane sheet and a second polyurethane sheet, said first polyurethane sheet includes a front and a back surface and said second polyurethane sheet includes a front and a back surface, said first polyurethane sheet includes a fluorine resin layer laminated to said front surface of said first polyurethane sheet and said first polyurethane sheet includes a fluorine resin layer laminated to said back surface of said first polyurethane sheet, said second polyurethane sheet includes a fluorine resin layer laminated to said front surface of said second polyurethane sheet and said second polyurethane sheet includes a fluorine resin layer laminated to said back surface of said second polyurethane sheet, said first polyurethane sheet and said second polyurethane sheet are integrally molded together, said flexible belt member includes a plurality of cable inserting tubular portions, and said plurality of cable inserting tubular portions are unitarily molded in parallel, said plurality of cable inserting tubular portions are parallel to each other;
    a plurality of block bodies flexibly and articulately connected with each other by pivotable concave-convex snap-fittings;
    said plurality of block bodies flexibly connected with each other forming a train of block bodies;
    each of said plurality of block bodies forming said train of block bodies are flexibly and articulately connected to each other in a longitudinal direction enabling said block bodies to form a flexional circumferential bend having a flexional inner circumferential side and flexional outer circumferential side;
    each of said block bodies includes a flexional inner circumferential side residing during bending on said flexional inner circumferential side of said bend;
    each of said block bodies includes a flexional outer circumferential side having a flexional outer peripheral side curved surface, said flexional outer peripheral side curved surface residing during bending on said flexional outer circumferential side of said bend, said flexional outer peripheral side curved surface has a radius of curvature, R, and, said flexional outer peripheral side curved surfaces forming a smooth circular arc during bending; and,
    said train of block bodies being inserted through at least one of said plurality of cable inserting tubular portions to control and support straight and flexed postures of said flexible belt member.

2. A multi-joint cable protection and guide device, according to claim 1, wherein each of said concave-convex snap-fittings of said block bodies includes connecting pins at front portions thereof and connecting pin holes at rear portions thereof and, said connecting pin of one of said block bodies snapping into said connecting pin hole of an adjacent block body.

3. A multi-joint cable protection and guide device, according to claim 1, wherein each of said block bodies includes tapered cut-away fitting portions at the rear portions thereof to enable concave-convex snap-fitting said connecting pins at the front side portions thereof into said connecting pin holes at the rear portion of the next adjacent block body.

4. A multi-joint cable protection and guide device, according to claim 1, wherein each of said block bodies includes:
    straight posture holding surfaces for keeping said block bodies in straight posture; and,
    flexed posture holding surfaces for keeping said block bodies in the flexed posture.

5. A multi-joint cable protection and guide device, according to claim 1, wherein each of said block bodies is molded from a synthetic resin material.

6. A multi-joint cable protection and guide device, according to claim 1, wherein each of said block bodies is formed into a rectangular shape in cross-section in which four corners are chamfered along the longitudinal direction.

7. A multi-joint cable protection and guide device, comprising:
    a flexible belt member, said flexible belt member includes a first polyurethane sheet and a second polyurethane sheet, said first polyurethane sheet includes a front and a back surface and said second polyurethane sheet includes a front and a back surface, said first polyurethane sheet includes a fluorine resin layer laminated to said front surface of said first polyurethane sheet and said first polyurethane sheet includes a fluorine resin layer laminated to said back surface of said first polyurethane sheet, said second polyurethane sheet includes a fluorine resin layer laminated to said front surface of said second polyurethane sheet and said second polyurethane sheet includes a fluorine resin layer laminated to said back surface of said second polyurethane sheet, said first polyurethane sheet and said second polyurethane sheet are integrally molded together, said flexible belt member includes a plurality of cable inserting tubular portions, and, said plurality of cable inserting tubular portions are unitarily molded in parallel, said plurality of cable inserting tubular portions are parallel to each other;

a plurality of block bodies flexibly and articulately connected with each other by pivotable concave-convex snap-fittings;

each of said pivotable concave-convex snap-fittings of said block bodies includes a connecting pin and a connecting pin hole;

said plurality of block bodies flexibly connected with each other forming a train of block bodies;

each of said plurality of block bodies forming said train of block bodies are flexibly and articulately connected to each other in a longitudinal direction enabling said block bodies to form a flexional circumferential bend having a flexional inner circumferential side and a flexional outer circumferential side;

each of said block bodies includes a flexional inner circumferential side residing during bending on said flexional inner circumferential side of said bend;

each of said block bodies includes a flexional outer circumferential side, said flexional outer circumferential side includes a flexional outer peripheral side curved surface, and, each of said flexional outer peripheral side curved surfaces of each of said block bodies residing during bending on said flexional outer circumferential side of said bend;

each of said flexional outer peripheral side curved surfaces of said flexional outer circumferential side of said block bodies has a radius of curvature, R, and, said flexional outer peripheral side curved surfaces forming a smooth circular arc during bending; and, said train of block bodies is inserted into one of said cable inserting tubular portions to control and support straight and flexed postures of said flexible belt member.

* * * * *